United States Patent Office 3,560,018
Patented Feb. 2, 1971

3,560,018
VEHICLE SAFETY APPARATUS
George W. Goetz, Detroit, Mich., assignor to Eaton Yale & Towne Inc., Cleveland, Ohio, a corporation of Ohio
Filed July 31, 1968, Ser. No. 749,063
Int. Cl. B60r 21/00
U.S. Cl. 280—150                4 Claims

ABSTRACT OF THE DISCLOSURE

A safety apparatus includes a reservoir containing fluid under pressure, means for opening the reservoir upon the occurrence of a collision, a diffuser for directing the flow of fluid from the reservoir, and a confinement adapted to be inflated from a collapsed condition to an expanded condition in which the confinement is operative to restrain an occupant of a vehicle against movement resulting from a collision. The relationship between the diffuser and the reservoir is such as to result in a directing of the flow of fluid from the reservoir without an undue restriction of the flow. The pressure-volume relationship between the fluid in the reservoir and the fluid in the inflated confinement is such as to provide sufficient fluid for inflating the confinement and absorbing the kinetic energy of an occupant engaging the inflated confinement during the collision.

---

The present invention relates generally to a vehicle safety apparatus, and more particularly to a vehicle safety apparatus which includes a confinement which is inflatable from a collapsed condition to an expanded condition upon the occurrence of a collision to restrain an occupant of the vehicle against movement resulting from the collision.

A known vehicle safety apparatus includes a reservoir of fluid under pressure, means for providing an opening in the reservoir upon the occurrence of a collision to enable fluid to escape from the reservoir, a diffuser for directing the flow of fluid, and a confinement which is inflated by the flow of fluid to restrain an occupant of the vehicle against movement. Such a safety apparatus is disclosed in United States application Ser. No. 562,289, now Pat. No. 3,414,292, assigned to the assignee of the present invention. In order for such a safety apparatus to be effective to protect the occupant of the vehicle during a collision, the confinement must be quickly inflated from the collapsed condition to the expanded condition by a flow of fluid from the reservoir through the diffuser. The fluid pressure in the inflated confinement must be sufficient to absorb the kinetic energy of the occupant of the vehicle to restrain the occupant of the vehicle against movement. The characteristics of the reservoir, diffuser, and confinement must be related so as to result in a rapid inflation of the confinement in a predetermined manner to a pressure sufficient to absorb the kinetic energy of an occupant of the vehicle upon the occurrence of a collision.

Moreover, exhaust means are known for confinements to minimize rebound of an occupant therefrom by exhausting fluid from the confinement. However, it has been discovered that the area of the exhaust means must have a certain relationship with the volume of the confinement to be completely effective.

Accordingly, it is an object of this invention to provide a safety apparatus of the above-noted type wherein the characteristics of the reservoir, diffuser, and confinement are related so as to provide for the rapid inflation of the confinement and provide a pressure in the confinement sufficient to absorb the kinetic energy of the occupant of the vehicle during the collision.

A further object of the present invention is the provision of a new and improved vehicle safety apparatus having specific average fluid flow rates from a diffuser to expand a confinement.

A still further object of the present invention is the provision of a new and improved vehicle safety apparatus having a diffuser with openings therein for directing fluid from a fluid supply to an expandable confinement and wherein the diffuser defines a flow path having a volume related to the flow of fluid from the reservoir and the area of the openings in the diffuser is related to the flow area from the reservoir.

Another object of the present invention is the provision of a new and improved vehicle safety apparatus which includes an inflatable confinement having exhaust means thereon for minimizing rebound of an occupant from the confinement and wherein the exhaust means is effective to relieve the confinement of an amount of potential energy, measured as the product of the volume of fluid flow through the exhaust means and the average pressure of the fluid in the confinement while in engagement with the occupant during a collision with the product being at least equal to the kinetic energy of the occupant.

Another object of this invention is to provide a new and improved vehicle safety apparatus including a reservoir for confining a quantity of fluid under pressure, means for opening the reservoir to allow the quantity of fluid confined therein to pass therefrom, a confinement adapted to be extended from an inoperative position to an operative position, and means for enabling the released quantity of fluid to be transferred from the reservoir to the confinement to effectively extend the confinement from the inoperative position to the operative position with at least a portion of the released quantity of fluid being contained therein, and wherein the confinement has means for enabling the fluid contained therein to have a controlled flow from the confinement when the confinement is disposed in the operative position with the means for providing the controlled flow being effective to limit the increase of pressure of the fluid in the confinement to a given value so that the product of the given value of the fluid pressure and the area of that portion of the confinement which will engage an occupant of a vehicle during a crash or collision condition divided by the mass of the occupant will be less than 40 g's.

Yet another object of this invention is to provide a new and improved vehicle safety apparatus including a reservoir for confining a quantity of fluid under pressure, means for opening a reservoir to allow the quantity of fluid confined therein to pass therefrom, means for enabling the fluid to be transferred from the reservoir to a confinement to expand the confinement from an inoperative position to an operative position, and wherein the means for enabling the released quantity of fluid to be transferred has at least one opening with an effective area of not less than 1.5 sq. inches and not in excess of 9.0 sq. inches for each square inch or fraction thereof of the effective opening in the reservoir.

A further object of the present invention is the provision of a new and improved vehicle safety apparatus comprising a confinement having exhaust means for exhausting fluid from the confinement to minimize rebound of the occupant therefrom and wherein the area for flow exhaust in square inches is substantially numerically equal to .70 to 1.00 times the expanded volume of the confinement in cubic feet taken to the 3/2 power.

These and other objects and features of the invention will become more apparent upon a consideration of the following description of the present invention taken in connection with the accompanying drawings wherein:

FIG. 1 is a schematic illustration of a vehicle safety apparatus constructed in accordance with the persent inven- 3,560,018 tion, the vehicle safety apparatus including a confinement which is shown in an inoperative or collapsed condition;

The present invention provides a new and improved vehicle safety apparatus which may be used in conjunction with vehicles to protect an occupant of the vehicle by restraining his movement during a collision. The vehicle safety apparatus includes a fluid supply, a diffuser for directing a flow of fluid from the supply, and a confinement which is adapted to be inflated from an inoperative or collapsed condition to an expanded or operative condition by a flow of fluid from the supply through the diffuser upon the occurrence of a collision. The construction and characteristics of the reservoir, diffuser, and confinement are such as to provide, upon the occurrence of a collision, a flow of fluid to the confinement without an undue restriction in the flow. The flow of fluid quickly inflates the confinement from the collapsed condition to the expanded condition and provides sufficient fluid pressure within the confinement to absorb the kinetic energy of an occupant of a vehicle to thereby restrain and protect the occupant during the collision.

Figure 1:
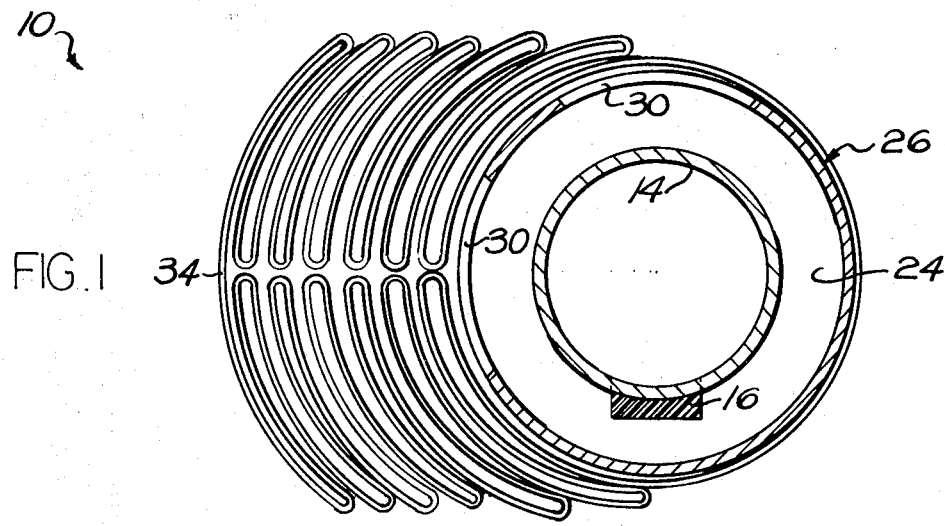

A vehicle safety apparatus 10, representing a preferred embodiment of the invention, is illustrated in FIG. 1 in a collapsed condition in which the safety apparatus is normally stored. Upon the occurrence of the collision, the safety apparatus 10 is quickly expanded to the operative condition of FIG. 2 to restrain an occupant against movement relative to the vehicle with which the safety apparatus 10 is associated. To this end, the safety apparatus 10 includes structure operable to supply fluid. In the preferred embodiment, this structure comprises a reservoir 14 which contains a supply of fluid under pressure. Upon the occurrence of a collision, as explosive charge 16 is detonated in a suitable manner, as by an electric current conducted by wires (not shown). Detonation of the charge 16 effects the formation of an opening 20 (see FIG. 2) in the reservoir 14 to enable the fluid to flow under pressure through the opening 20 into an annular space or passage 24 defined by a diffuser 26.

The diffuser 26 constitutes a means for directing fluid from the reservoir 14 to expand a confinement 34. The diffuser 26 includes a plurality of slots or openings 30 which direct the flow of fluid from the space 24 into the collapsed confinement 34 (see FIG. 1) in such a way as to inflate the confinement 34 from the collapsed inoperative condition or position of FIG. 1 to the expanded operative condition or position of FIG. 2. Thus, upon occurrence of a collision, the vehicle safety apparatus 10 is expanded from the inoperative condition or position of FIG. 1, wherein the confinement 34 is collapsed, to the operative condition or position of FIG. 2, wherein the confinement 34 is inflated to an expanded condition. In the expanded condition, the confinement 34 is adapted to restrain an occupant of the vehicle against movement during a collision to thereby protect the occupant of the vehicle. Since the safety apparatus 10 can take many forms, for example, the form disclosed in application Ser. No. 562,289, filed July 1, 1966 by Oldberg and Carey, it has been illustrated schematically in FIGS. 1–7 and it is believed that a further description of the general structure of the safety apparatus 10 is not necessary at this time.

The safety apparatus 10, as illustrated in FIGS. 3–7, is associated with a vehicle 40 wherein the safety apparatus 10 is operative to protect an occupant 42 of the vehicle during a collision by restraining the occupant against movement resulting from the collision. Before the occurrence of a collision, the safety apparatus 10 is in the inoperative or collapsed condition or position of FIG. 3. Upon the occurrence of a collision, the explosive charge 16 (see FIG. 1) is ignited or detonated to form the opening 20 (FIG. 2) in the reservoir 14 to enable fluid under pressure to escape from the reservoir 14 to the space 24 between the diffuser 26 and the reservoir 14. The fluid then flows under pressure through the slots or openings 30 in the diffuser 26 into the confinement 34 to effect an expansion of the confinement from the collapsed condition of FIGS. 1 and 3 to the expanded condition of FIGS. 2 and 4. The slots 30 in the diffuser 26 may be positioned to direct the flow of fluid from the space 24 in such a manner as to substantially inflate the confinement 34 to the expanded condition before the confinement and the occupant 42 enage. This manner of expanding the confinement 34 protects the occupant 42 against injury due to an impact of the confinement against the occupant as the confinement is being quickly inflated from the collapsed condition to the expanded condition.

Figure 5:
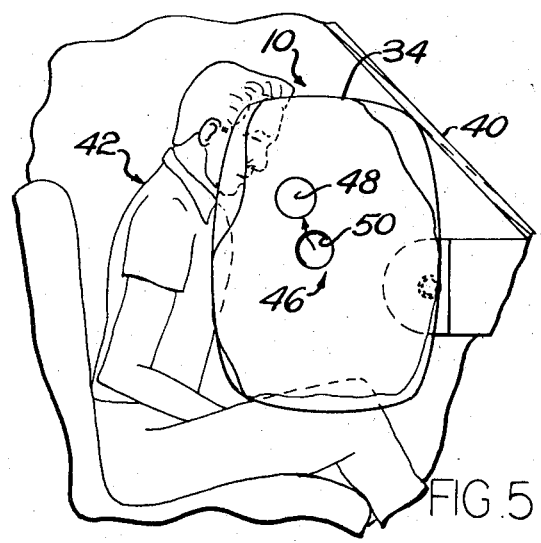
FIG. 5 is a schematic illustration showing the relationship between the inflated confinement and the occupant of the vehicle immediately after the occurrence of the collision and the inflation of the confinement to the operative or expanded condition.

The occupant 42 moves forwardly, under the influence of collision forces, into engagement with the confinement in the manner shown schematically in FIG. 5. The confinement operates to absorb the kinetic energy of the occupant and thus restrains or slows the occupant's movement. Moreover, the absorbed kinetic energy of the occupant is dissipated by the confinement.

In order to dissipate the kinetic energy of the occupant and minimize rebound of the occupant 42 from the confinement 34, the confinement 34 includes an exhaust means, which in the preferred embodiment comprises a blow-out assembly 46. The blow-out assembly 46 is operative to enable the fluid to flow out of the confinement 34 at a controlled rate to limit the increase of fluid pressure in the confinement and, consequently, the force applied against the occupant 42 by the confinement during a collision. Accordingly, the blow-out assembly 46 includes a patch 48 which is blown out of the side of the confinement 34 by fluid pressure within the confinement to provide a hole or aperture 50 through which fluid escapes from the confinement (see FIG. 5). Thus, upon the occurrence of a collision, the confinement 34 is inflated from the collapsed condition of FIG. 3 to the expanded condition of FIG. 4 to restrain forward movement of the occupant 42 in the manner shown in FIGS. 5 and 6. As the occupant 42 moves into engagement with the expanded confinement, as shown in FIG. 5, the blow-out assembly 46 provides an aperture 50 through which fluid escapes from the confinement to thereby dissipate the kinetic energy of the occupant and thereby minimize rebound of the occupant 42 from the confinement and to limit the restraining effect of the safety apparatus 10 on the movement of the occupant 42 to a force which will not be injurious to the occupant.

Figure 7:
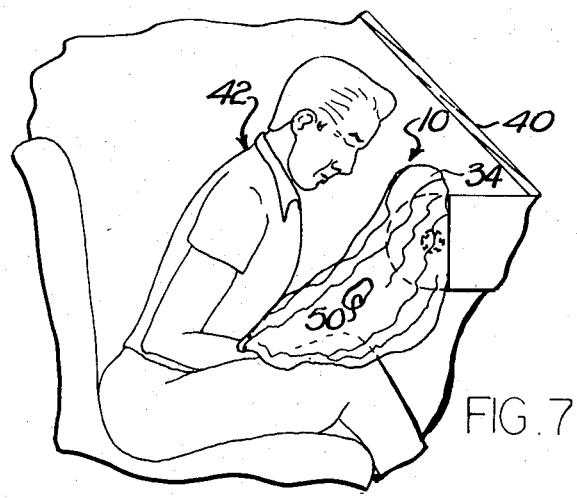
FIG. 7 is a schematic illustration showing the occupant of the vehicle and the confinement in a deflated condition or position which occurs a short time after the collision.

After the safety apparatus 10 has performed its intended function, that is restraining the occupant 42 against movement during the collision to protect the occupant against engagement with parts of the vehicle 40, the fluid within the confinement flows out of the exhaust means or aperture 50 so that the confinement is deflated to a second collapsed or inoperative condition (FIG. 7).

Figure 2:
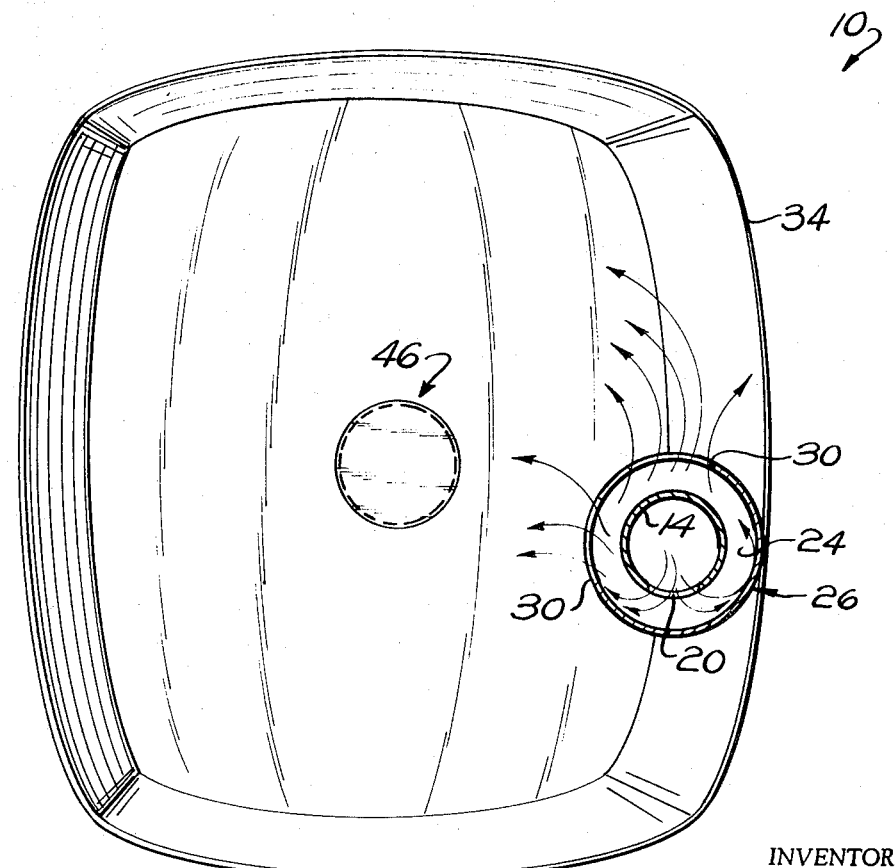
FIG. 2 is a schematic illustration, on a reduced scale, of the vehicle safety apparatus of FIG. 1, the confinement being shown in an operative or expanded condition in which the confinement is adapted to restrain movement of an occupant of a vehicle during a collision.

In accordance with the present invention, the characteristics of the confinement 34, reservoir 14 and diffuser 26 and their mutual interrelationships are such as to enable the confinement 34 to be quickly inflated from the collapsed condition of FIG. 1 to the expanded condition of FIG. 2 within a time of between .010 and .100 second after the instant of vehicle impact with an obstruction or occurrence of a collision. To this end, the opening 20 in the reservoir 14 is of adequate size to enable the fluid to quickly escape from the reservoir but at flow rates which will not cause bursting of the confinement.

Figure 3:
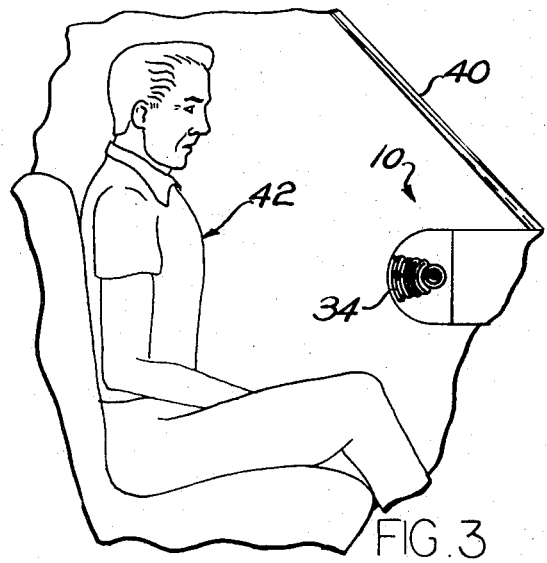
FIG. 3 is a schematic illustration, on a greatly reduced scale, of the vehicle safety apparatus installed in a vehicle in the collapsed condition of FIG. 1.

The previously described construction of the reservoir 14 results in a flow of fluid from the reservoir 14 through the opening 20 at a rate which is sufficient to inflate the confinement 34 before the occupant 42 has had time to move from the position shown in FIG. 3 forwardly to a position similar to that shown in FIG. 5. If a relatively small opening 20 is provided in the reservoir 14, the flow of fluid through the relatively small opening is insufficient to inflate the confinement 34 to the expanded condition to restrain movement of the occupant 42 before the occupant moves forwardly to such a position as to be injured by engagement with a part of the vehicle or by the inflation of the confinement 34. If a relatively large opening 20 is formed in the reservoir 14 by the detonation of the explosive charge 16, there is a danger of rupturing or ripping the confinement 34 with the force of the fluid flowing therein.

As noted above, the fluid under pressure in the reservoir 14 is released by the formation of the opening 20. A portion of the fluid then flows into the space 24 between the diffuser 26 and the reservoir 14. The diffuser 26 directs a flow of fluid from the space 24 into the confinement 34 by means of the slots 30. The slots 30 direct the flow of fluid in such a manner as to effect a substantial inflation of the confinement from the collapsed condition of FIGS. 1 and 3 to the expanded condition of FIGS. 2 and 4 before the confinement engages the occupant 42 of the vehicle 40 to thereby protect the occupant against injury due to an impact between the occupant and the rapidly expanding confinement. In addition to being operative to effect the expansion of the confinement 34 in a predetermined manner, the slots 30 must enable the fluid to flow from the space 24 into the confinement 34 without unduly restricting the flow of fluid to thereby enable the confinement to be rapidly inflated from the collapsed condition to the expanded condition.

By experimentation, it has been determined that the afore-mentioned characteristics are obtained when the effective area of the slots or openings 30 in the diffuser 26 are at least 1.5 sq. inches and not more than 9.0 sq. inches for each square inch or fraction thereof of the opening 20 in the reservoir 14. This sizing of the slots 30 prevents the slots from unduly restricting the flow of fluid from the space 24 while enabling the slots 32 to effectively direct the flow of fluid to expand the confinement in a predetermined manner.

To promote a relatively even rate of flow of fluid throughout the axial or longitudinal extent of the diffuser 26, the space 24 extends for substantially the entire length of the diffuser. The volume of the space 24 is then such as to define a flow path having a volume of at least 0.4 cu. inch and not in excess of 12.0 cu. inches for each pound of fluid per second or fraction thereof that initially flows through the opening 20 in the reservoir 14. This results in the fluid pressure within the space 24 being equal to less than one-half the pressure of the fluid in the reservoir 14 during the time interval when the confinement 34 is being inflated from the collapsed condition of FIGS. 1 and 3 to the expanded condition of FIGS. 2 and 4.

Figure 4:
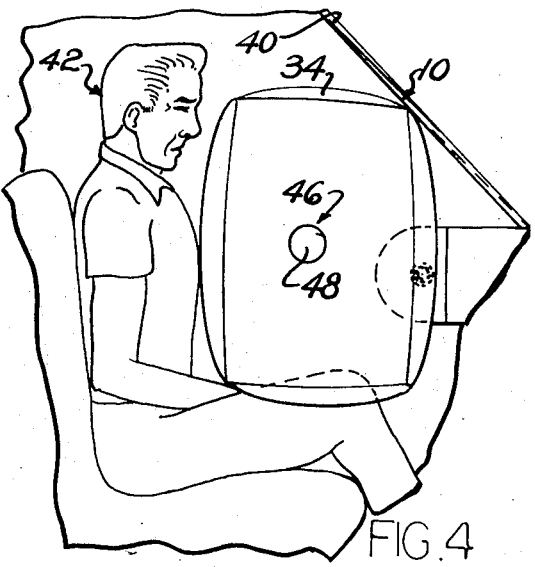
FIG. 4 is a schematic illustration of the vehicle safety apparatus of FIG. 3 in the operative or expanded condition in which the vehicle safety apparatus is operative to restrain movement of the occupant of the vehicle during a collision.
Figure 6:
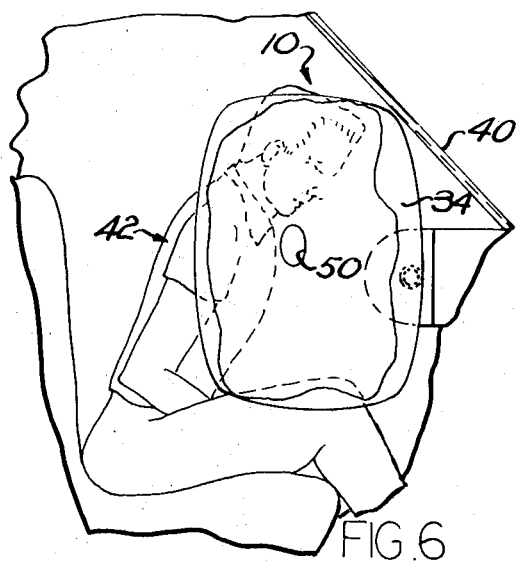
FIG. 6 is a schematic illustration showing the relationship of the expanded or operative confinement and the occupant of the vehicle a short time after the condition illustrated in FIG. 5.

Upon the occurrence of a collision, the occupant 42 moves forwardly from the position shown in FIG. 4, into engagement with confinement 34, as shown in FIG. 5, to the position shown in FIG. 6. This forward movement of the occupant 42 is resisted by the confinement 34 which absorbs the kinetic energy of the occupant to restrain the occupant against engagement with a part of the vehicle 40. The blow-out assembly 46 is provided in the confinement 34 to enable the confinement to dissipate the kinetic energy of the occupant by relieving the confinement of an amount of potential energy equal to the kinetic energy of the occupant. The amount of potential energy so relieved from the confinement is measured as a product of the volume of the fluid flow through the blow-out assembly 46 and the average pressure of fluid in the confinement while the confinement is in engagement with the occupant 42 during the crash or collision. Accordingly, the blow-out patch 48 is ruptured or blown loose from the side of the confinement 34 when the pressure within the confinement 34 reaches a predetermined value to enable the fluid to escape from the confinement and limit the increase in pressure within the confinement to thereby prevent rebound of the occupant 42 from the confinement and to enable the occupant 42 to move forwardly into the confinement from the position shown in FIG. 5 to the position shown in FIG. 6. To this end, the total opening through which fluid flows from the confinement, in this case the opening 50, has an area which is approximately numerically equal to .70 to 1.00 times the volume of the expanded confinement taken to the ⅔ power. This sizing of the opening 50 is effective to limit the increase of fluid pressure within the confinement to a predetermined value so that the product of the predetermined value of the fluid pressure and the area of the portion of the confinement which is engaged by the occupant 42 during a crash or collision condition divided by the mass of the occupant is less than 40 $g$'s after engagement of the occupant with the confinement.

The operation of the blow-out assembly 46 enables the fluid within the confinement 34 to flow out of the confinement. In order to prevent an immediate collapse of the confinement from the condition shown at FIGS. 5 and 6 to the condition of FIG. 7 and a movement of the occupant 42 into engagement with the vehicle 40 under the influence of the collision forces, a continuing flow of fluid to the confinement 34 from the reservoir 14 after the aperture 50 has been opened is provided. To provide for this continuing fluid flow, only a portion of the fluid which is retained under pressure within the reservoir 14 flows into the confinement 34 upon the detonation of the explosive charge 16 and the formation of the opening 20. The remaining portion of the fluid within the reservoir 14 flows into the confinement 34 after the blowing out of the patch 48 to enable the confinement to be effective to absorb energy generated by movement of the occupant 42 against the confinement and to enable this energy to be dissipated by movement of the occupant into the confinement, in the manner shown in FIG. 6, and a flowing of fluid under pressure from the confinement through the aperture 50.

In view of the foregoing, it can be seen that a safety apparatus is provided by the present invention for use in a vehicle to protect occupants of the vehicle during a collision. The safety apparatus includes a confinement which is adapted to be inflated from a collapsed or inoperative condition to an expanded or operative condition by a flow of fluid from an inflation assembly which includes a reservoir of fluid under pressure and a diffuser for directing the flow of fluid from the reservoir. Upon the occurrence of a collision, an opening 20 is formed in the reservoir 14. The opening 20 has an area sufficient to enable fluid to flow under pressure from the reservoir at a relatively high rate to a space 24 defined by the diffuser 26, and then through slots 30 in the diffuser into the confinement 34 to inflate the confinement. The space 24 between the diffuser 26 and the confinement 34 has sufficient volume to enable the fluid to flow axially or longitudinally along the diffuser to provide a generally even flow of fluid through the slots 30 into the confinement 34. The slots 30 in the diffuser are of such a size as to direct the flow of fluid while providing a minimum of restriction to the flow of fluid. The confinement includes an exhaust or blow-out assembly 46 which enables fluid to flow out of the confinement after a predetermined pressure has been reached within the confinement. The blow-out assembly is constructed in such a manner as to enable the fluid to flow out of the confinement at a rate which will limit the product of the fluid pressure and area of the portion of the confinement which engages an occupant of the vehicle to a value which will be less than 40 g's.

Having described my invention, I claim the following:

1. A safety system for vehicles comprising structure operable to supply fluid, means for operating the structure to allow fluid to pass therefrom, a confinement adapted to be expanded from an initial inoperative position to an operative position, and means for enabling the fluid to be transferred from the structure to expand the confinement from the initial inoperative position to the operative position, said confinement having aperture means for enabling the confinement to be retracted from the operative position to a second inoperative position, said aperture means having an effective area in square inches substantially numerically equal to .70 to 1.00 times the volume of the confinement in cubic feet when the confinement is disposed in the operative position taken to the ⅔ power.

2. A safety system for vehicles comprising a reservoir for confining a quantity of fluid under pressure, means for opening the reservoir to allow the quantity of fluid confined therein to pass therefrom, a confinement adapted to be expanded from an inoperative position to an operative position, and means for enabling the released quantity of fluid to be transferred from the reservoir to expand the confinement from the inoperative position to the operative position, said last stated means having at least one opening therein with said opening having an effective area of at least 1.5 square inches not exceeding 9.0 square inches for each square inch or fraction thereof of the effective opening in the reservoir.

3. A safety system for vehicles comprising a reservoir for confining a quantity of fluid under pressure, means for opening the reservoir to allow the quantity of fluid confined therein to pass therefrom, a confinement adapted to be expanded from an inoperative position to an operative position and transfer means for enabling the released quantity of fluid to be transferred from the reservoir to expand the confinement from the inoperative position to the operative position, said last stated means defining a flow path having a volume of at least 0.4 cubic inch not to exceed 12.0 cubic inches for each pound of fluid per second or fraction thereof of the fluid that initially flows through the opening in the reservoir, the pressure of the fluid in the transfer means being less than ½ the pressure of the fluid in the reservoir during the time interval when the confinement is being expanded from the inoperative position to the operation position.

4. A safety system for vehicles comprising a fluid supply means providing for fluid flow from said fluid supply, a confinement adapted to be expanded from an inoperative position to an operative position, and means for enabling the fluid to be transferred from the supply to the confinement to expand the confinement from the inoperative position to the operative position with at least a portion of the released quantity of fluid being contained therein, said confinement having exhaust means for enabling a portion of the fluid contained therein to flow therefrom with the fluid flow through the exhaust means being effective to relieve the confinement of an amount of potential energy measured as the product of the volume of fluid flow through the exhaust means and the average pressure of the fluid in the confinement while the confinement is in engagement with an occupant of the vehicle during a crash or collision condition with the product being at least equal to the kinetic energy of such occupant, said exhaust means including an aperture means having an area in square inches substantially numerically equal to .70 to 1.00 times the volume of the confinement in cubic feet when the confinement is disposed in the operative position taken to the 3/2 power to thereby provide a controlled flow of fluid from the confinement with said aperture means being effective to limit the increase of pressure of the fluid in the confinement to a given value so that the product of the given value of the fluid pressure and the area of that portion of the confinement which engages an occupant of the vehicle during a crash or collision divided by the mass of such occupant is less than 40 g's.

References Cited

UNITED STATES PATENTS

| 3,411,807 | 11/1968 | Carey et al. | 280—150 |
| 3,413,013 | 11/1968 | Wissing et al. | 280—150 |
| 3,414,292 | 12/1968 | Oldberg et al. | 280—150 |
| 3,425,712 | 2/1969 | Berryman | 280—150 |
| 3,451,693 | 6/1969 | Carey | 280—150 |
| 3,460,853 | 8/1969 | Chute | 280—150 |

FOREIGN PATENTS

| 953,312 | 3/1964 | Great Britain | 280—150 |

KENNETH H. BETTS, Primary Examiner